US008056139B2

(12) United States Patent
Witt et al.

(10) Patent No.: US 8,056,139 B2
(45) Date of Patent: Nov. 8, 2011

(54) METHOD AND SYSTEM FOR AUTHORIZING MULTIMEDIA MULTICASTING

(75) Inventors: Daniel Witt, Center Moriches, NY (US); Jon Rachwalski, Holbrook, NY (US)

(73) Assignee: VectorMAX Corporation, Farmingdale, NY (US)

( * ) Notice: Subject to any disclaimer, the term of this patent is extended or adjusted under 35 U.S.C. 154(b) by 860 days.

(21) Appl. No.: 11/244,443

(22) Filed: Oct. 5, 2005

(65) Prior Publication Data

US 2006/0085862 A1    Apr. 20, 2006

(51) Int. Cl.
G06F 7/04 (2006.01)

(52) U.S. Cl. .................. 726/26; 726/5; 726/28; 726/29; 709/231; 709/227; 709/228; 709/229; 707/E17.009

(58) Field of Classification Search .................. 726/2, 3, 726/5, 9, 26, 27, 29, 4; 709/230, 231
See application file for complete search history.

(56) References Cited

U.S. PATENT DOCUMENTS

| | | | |
|---|---|---|---|
| 5,899,983 A | | 5/1999 | Hussmann |
| 6,170,060 B1 * | | 1/2001 | Mott et al. ....................... 726/29 |
| 6,226,752 B1 * | | 5/2001 | Gupta et al. ....................... 726/9 |
| 6,275,859 B1 * | | 8/2001 | Wesley et al. .................. 709/229 |
| 7,054,949 B2 * | | 5/2006 | Jennings ......................... 709/238 |
| 7,225,207 B1 * | | 5/2007 | Ohazama et al. ..................... 1/1 |
| 2001/0037469 A1 | | 11/2001 | Gupta et al. |
| 2002/0107803 A1 * | | 8/2002 | Lisanke et al. .................. 705/51 |
| 2002/0184630 A1 * | | 12/2002 | Nishizawa et al. ............. 725/44 |
| 2003/0097564 A1 * | | 5/2003 | Tewari et al. .................. 713/171 |
| 2003/0163569 A1 * | | 8/2003 | Panasyuk et al. ............. 709/227 |
| 2003/0172165 A1 * | | 9/2003 | Xu et al. ......................... 709/228 |
| 2004/0083297 A1 * | | 4/2004 | Gazzetta et al. ............. 709/229 |
| 2004/0117500 A1 * | | 6/2004 | Lindholm et al. ............. 709/231 |
| 2005/0044255 A1 * | | 2/2005 | Yokoyama ..................... 709/231 |

FOREIGN PATENT DOCUMENTS

| | | |
|---|---|---|
| WO | WO 01/58163 A2 | 8/2001 |
| WO | WO 01/58163 A2 * | 9/2001 |
| WO | WO 02/084980 A1 * | 10/2002 |
| WO | WO 2004/066568 A2 | 8/2004 |

OTHER PUBLICATIONS

Koshutanski, "Distributed Access Control for Web and Business Processes", Technical Report # DIT-03-034, Jun. 1, 2003, University of Trento, Trento, Italy.

* cited by examiner

*Primary Examiner* — Thanhnga Truong
*Assistant Examiner* — Jason Lee
(74) *Attorney, Agent, or Firm* — Jack Schwartz & Associates, PLLC

(57) ABSTRACT

A multicasting authorization system comprises a streaming server, an authorization server, a user system and a distribution server. The distribution server provides a multicast data stream over multicast channels. A user system requests and receives an authorization code from an authorization server to receive the multicast data stream, and provides the authorization code to a streaming server. A streaming server, coupled to both an authorization server and a user system sends start up information for accessing the multicast data stream to the user system upon validation of the authorization code. The multicast datastream is encrypted and the user system maintains a connection with the authorization server which provides a cryptographic key for use in decrypting the encrypted multicast datastream.

19 Claims, 4 Drawing Sheets

METHOD AND SYSTEM FOR AUTHORIZING MULTIMEDIA MULTICASTING

FIELD OF THE INVENTION

The present invention relates to the field of multimedia communication and, more specifically, to a broadcast system and method for authorizing reception of multicasted multimedia data streams.

BACKGROUND OF THE INVENTION

Efficient network security enables successful digital multimedia transmissions. Network authentication protocol designed to provide authentication for client/server applications by using secret-key cryptography exists in today's technology. Used with a communications protocol, network authentication protocols provide secure delivery of data between two parties.

Secure socket layer (SSL) is the leading security protocol on the Internet. SSL is widely used to validate the identity of a Web site and to provide authentication and encryption in order to send sensitive data such as credit card and other personal data to a vendor. Successful authentication proves the identity of the user or client machine attempting to log on. The authenticated user is granted access to specific resources based on predefined policies and the permission level assigned to the user or user group.

The process of authenticating a user involves verifying the integrity of a transmitted message between two parties. When users log onto a network, their identities must be verified and an authentication method is used to prove the identity of each specific user. When a user logs on, the network access server (NAS), wireless access point or authentication server creates a "challenge," which is typically a random number sent to the client machine.

An authentication token is a security device provided to authorize users who keep them in their possession. To log onto the network, the security "card" or "token" may be read directly like a credit card, or it may display a changing number that is typed in as a password. The latter has also been implemented entirely in software.

Challenge/response systems may also work with an authentication token, which is a smart card or credit-card sized card that users have in their possession. When users log on, they respond to the challenge by either inserting their smart card into a reader or typing in the password displayed on the card's readout. In this example, either the network access server or the authentication server generates a random number and sends it to the client as the challenge. The client uses a hash algorithm to combine the challenge and password and send the result back. The originating component performs the same hash step and compares it to the client's results. If they match, the system knows the client has the correct password.

Another widely used form of network security is cryptography. Cryptography is the creation, distribution and maintenance of a secret key. Cryptography determines how secret keys are generated and made available to both parties. A secret key is a binary number that is typically from 40 to 256 bits in length. The greater the number of bits in the key (cipher strength), the more possible key combinations and the longer it would take to break the code. Data is encrypted by combining the bits in the key mathematically with the data bits. At the receiving end, the key is used to unlock the code and restore the original data. Public key systems are widely used for exchanges. If session keys are used, key management is responsible for generating them and determining when they should be renewed.

Passwords, digital signatures, and smart cards can also be used to prove the identity of the client to the network. The client software uses its password or a secret key to encrypt the identity via an encryption algorithm or a one-way hash function and sends the result back to the network. The authentication system also performs the same cryptographic process on the challenge and compares its result to the response from the client. If they match, the authentication system has verified that the user has the correct password. While passwords are widely used to identify a user, they only verify that a user knows the password. Digital signatures guarantee that information has not been modified. The two major applications of digital signatures are for setting up a secure connection to a Web site and verifying the integrity of files transmitted. Smart cards function similarly to digital signatures. Smart cards, however, verify that users have a physical token in their possession.

Kerberos is an access control system designed to operate in both small companies and large enterprises with multiple domains and authentication servers. The Kerberos concept uses a "master ticket" obtained at logon, which is used to obtain additional "service tickets" when a particular resource is required. When users log on to a Kerberos system, their password is encrypted and sent to the authentication server in the Key Distribution Center (KDC). If successfully authenticated, the KDC creates a master ticket that is sent back to the user's machine. Each time the user wants access to a service, the master ticket is presented to the KDC in order to obtain a service ticket for that service. The master-service ticket method keeps the password more secure by sending it only once at logon. From then on, service tickets are used, which function like session keys.

In a typical multimedia system, a server responds to connection requests made by clients across a data network. Each client is subject to conventional access control to authorize reception of multimedia information across the same connection. The system can authorize clients, but is bandwidth intensive. Therefore, there is a need to streamline the authorization process in multimedia systems responding to client requests.

In a typical multimedia streaming system, a streaming server provides multicast data streams over multicast channels. A user system requests and receives an authorization code from an authorization server to receive the multicast data stream, and provides the authorization code to a streaming server. The streaming server, coupled to both an authorization server and a user system, sends the multicast data stream information to the user system upon validation of the authorization code.

To reduce the bandwidth needs of a streaming system, some streaming servers respond to stream-oriented connection requests made across the network by streaming clients differently. Instead of receiving a copy of the multimedia stream, the clients receive information detailing a multicast group where the stream data can be found. The clients then receive multimedia streams by subscribing to the specified multicast group. Once clients have subscribed to a multicast group, they are no longer subject to access control. The system is less secure and security credentials can be shared among multiple subscribers, but it is less bandwidth intensive in the event the system serves a relatively large number of clients who are viewing relatively few multimedia streams.

Large businesses with streaming systems deployed across a wide and heterogeneous network have strong fiscal incentive to utilize the more bandwidth efficient multicast system.

However, such businesses also have obligations to secure the content they broadcast. Thus, large businesses need systems that offer a way to authorize client reception for the entire duration of a multicast group subscription.

SUMMARY OF THE INVENTION

The present system relates to the field of multimedia communication and, more specifically, to a system and method for authorizing reception of multicasted multimedia.

A method and system according to invention principles authorizes receipt of a multicast data stream by a user system. The user system requests an authorization code from an authorization server to receive the multicast data stream. The authorization code is received from the authorization server and provided to a streaming server. The streaming server validates the authorization code and provides startup information for accessing the multicast data stream information to the user system upon validation of the authorization code.

A system is provided to authorize reception of multimedia content across a multicast transmission channel by media player clients. In accordance with a first aspect of the system, a media player client authorizes multicasted playback by maintaining a backchannel connection to an authorization server. The system employs a streaming server, an authorization server, and a media player. The streaming server is configured to provide information so that authorized media player clients to access a multicasted multimedia data stream. The media player contacts the authorization server and establishes a backchannel. The media player uses the backchannel to provide user and password credentials to the authorization server. Successful authorization of the user and password credentials results in a token being returned to the media player over the backchannel. The media player then contacts the streaming server with the authorization token. The token is used by the streaming server to authorize transmission of a particular stream by validating the request with the authorization server. In the case of successful authorization, multicast session information is returned to the media player from the streaming server allowing the media player to access the multicast datastream. The multicast data stream is encrypted. The backchannel connection between the media player and the authorization server is maintained through the multicast session. A cryptographic key is provided by the authorization server via the backchannel to the media player for use in decrypting the encrypted multicast session information according to a cryptographic decryption process.

The system overcomes the shortcomings of the existing systems by providing a method authorizing reception of multicasted multimedia in a manner that provides significantly enhanced security and minimizes the bandwidth necessary to receive the multicasted multimedia by providing the media player with information to access the multicasted multimedia data stream.

A system according to invention principles address these deficiencies and associated problems.

BRIEF DESCRIPTION OF THE DRAWING FIGURES

DETAILED DESCRIPTION OF THE INVENTION

An application as used herein is an executable application comprising code or machine readable instruction for implementing predetermined functions including those of an operating system, healthcare information system or other information processing system, for example, in response to user command or input. An executable procedure is a segment of code (machine readable instruction), sub-routine, or other distinct section of code or portion of an executable application for performing one or more particular processes and may include performing operations on received input parameters (or in response to received input parameters) and provide resulting output parameters. A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. Multimedia content or content stream as used herein is any encoded or un-encoded data having at least one of video data and audio data. A media player application as used herein comprises an application that allows a user to at least one of request, select, manage, view, transmit, receive and playback audio, video or audio-video data thereon. A streaming server as used herein is a dedicated system for providing a continuous data stream (encoded or un-encoded) comprising at least one of video data and audio-video data for receipt by a client application on which the data stream is able to be further processed. An authorization server as used herein comprises any software application or hardware apparatus able to determine if a particular user has the right or permission to use a system resource. A multicast data stream as used herein comprises a continuous stream of data having at least one of video and audio-video data encoded therein originating from a single source that transmitted and broadcast to members of a specified group or users or a specified system. Authorization code as used herein is a data string provided to the media player application for use in validating the media player application and granting access to receive a multicast data stream.

Furthermore, all functions of FIGS. 1-4 can be implemented using software, hardware or a combination thereof.

Figure 1:
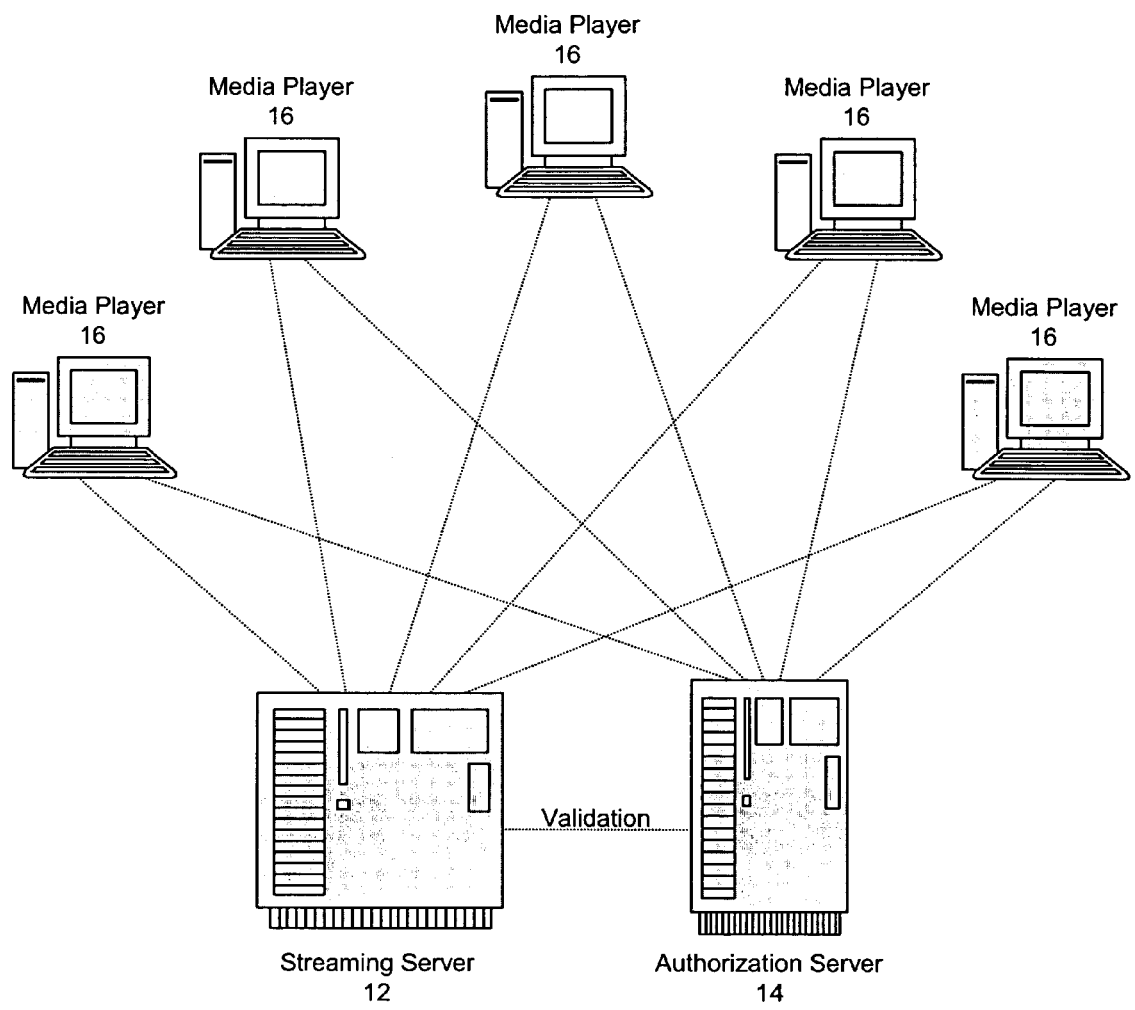
FIG. 1 is an illustrative view of a plurality of clients in connection with a streaming server to view multicasted multimedia content, according to invention principles.

FIG. 1 shows a plurality of client applications in connection with a streaming server to receive multicasted multimedia content. The system comprises a plurality of media player client applications 16, a streaming server 12 and an authorization server 14. The plurality of media player applications 16 are individually connected to the streaming server 12 and the authorization server 14. Furthermore, the streaming server 12 is connected to the authorization server 14. These connections may include, but are not limited to, wide area networks (WAN), local area networks (LAN) and wireless connections.

A client utilizes a media player application 16 to both request and view the multimedia data stream. With respect to the system, the multimedia stream sought by the media player application 16 is multimedia content provided from a location which is accessible based upon information received from the streaming server 12. The multimedia content can include but is not limited to streaming video and/or audio content. Furthermore, the streaming content can be pre-recorded audio-video data streams or live-captured audio-video data streams each for viewing by a requesting client. The authentication server 14 provides a mechanism for securing the data streams transmitted across a multicast network in a manner that is discussed below.

The streaming server 12 is configured to provide information concerning startup information for accessing a data stream to media player client applications 16 having validated key tokens 20 provided by the authorization server 14, as will be discussed in greater detail with respect to FIG. 2. The key token includes but is not limited to at least one of identification information for the media player client application 16, information identifying the active session for which the media player is requesting access, etc.

Thus, the media player client application 16 contacts the authorization server 14 and submits a request for a key token 20. The request includes user and password credentials and is provided through a backchannel 18 to the authorization server 14. Upon receipt of user and password credentials, the authorization server 14 authorizes the user and password credentials. Successful authorization results in a key token 20 identifying the media player and the active session for access of a resource being returned to the media player application 16. The media player application 16 receives the key token 20 via the backchannel 18 and maintains a connection with the authorization server 14 through the backchannel 18. Once the key token 20 is received by the media player application 16, the media player application 16 contacts the streaming server 12 and provides the streaming server 12 with the authorization key token 20. The streaming server 12 contacts the authorization server 14 and provides the key token 20 along with a validation request to the authorization server via a validation channel. The authorization server 14 receives and processes the validation request and key token 20 from the streaming server 12. The authorization server 14 checks the key token 20 to ensure it is valid and authorizes the streaming server 12 to provide multicast session information to the media player client 16. Once validation of the key token 20 is received by the streaming server 12, multicast session information is returned to the media player application 16 to enable the media player to access the requested multimedia content stream. The streaming server provides start up information to the media player including information on where and how to access a distribution server transmitting the multicast multimedia data stream. Upon receipt of the start up information the connection between the media player 16 and the streaming server 12 is terminated.

Media player applications 16 that do not provide valid key tokens 20 are denied access to multicast session information. Each media player application 16 is required to obtain a valid key token 20 from the authorization server 14 and provide the key token 20 to the streaming server in order to gain access to the multicast session information. Additionally, the media player client 16 is required to maintain the backchannel 18 connection with the authorization server 14 throughout the multicast session.

A distribution server (not shown) transmitting the multicasted multimedia data stream is accessible by the media player 16 based upon access information provided by the streaming server. The data stream is transmitted as a multicast data stream and is encrypted. Upon contacting the location from which the data stream is transmitted, the media player 16 is able to receive the encrypted data stream. The media player is also provided with a cryptographic key by the authorization server via the backchannel connection. The cryptographic key is used by the media player to decrypt the encrypted data stream using a cryptographic decryption process. The distribution server transmits the multicast data stream without being able to determine if a media player has received the transmission. As the cryptographic key is required to recover the decrypted data stream, it is possible to determine if a media player has received the data stream.

Figure 2:
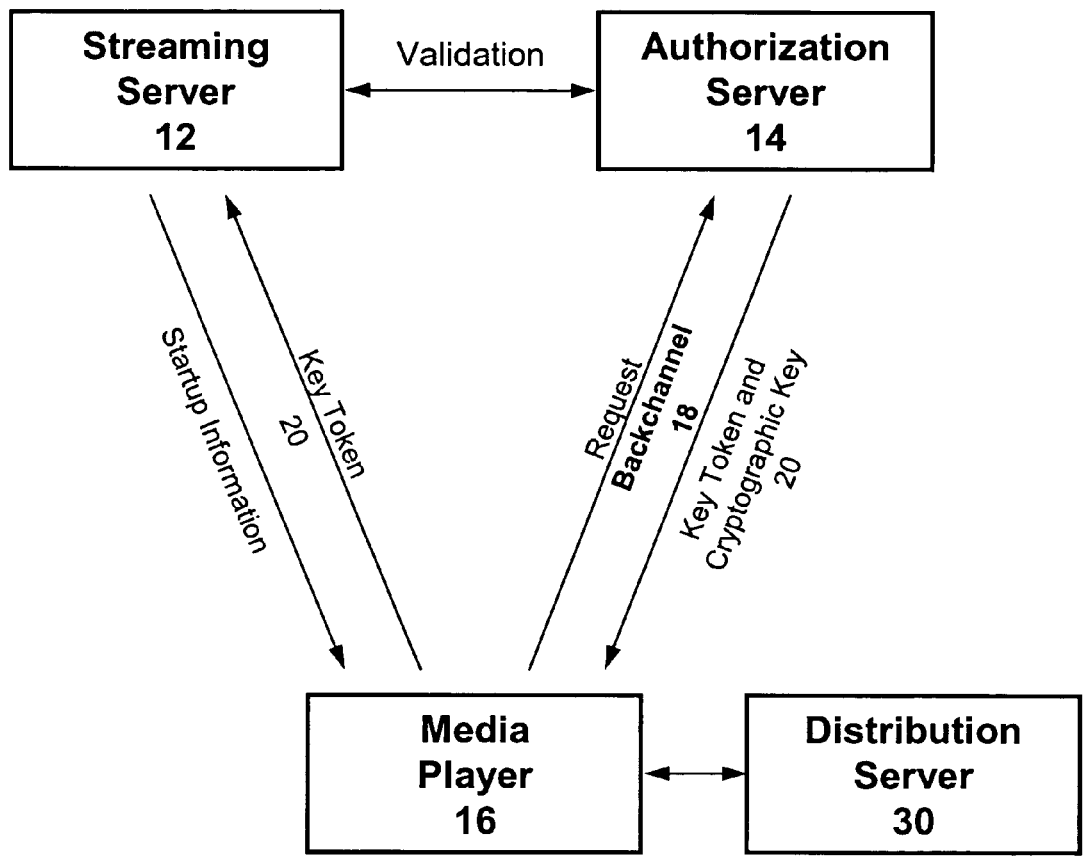
FIG. 2 is a block diagram of the multicast system according to invention principles.

FIG. 2 is a block diagram of the system for authorizing multimedia multicasting. The system 10 employs a streaming server 12, an authorization server 14 and a media player client application 16. A client obtains access to a multimedia datastream having audio and video data encoded therein by utilizing a media player application 16 to both request and view the multimedia data stream. With respect to the system, the multimedia stream sought by the client is multimedia content stored on a distribution server 30 that transmits the multimedia content across a multicast transmission channel. The multimedia content can include but is not limited to streaming video and/or audio content. Furthermore, the streaming content can be pre-recorded audio-video data streams or live-captured audio-video data streams each for view by a requesting client. The system 10 of the present invention further includes an authorization server 14 that is in communication with each of the media player client 16 and the streaming server 12. The authentication server 14 provides a mechanism for securing the data streams transmitted by the distribution server 30 across a multicast network.

The streaming server 12 is configured to authorize media player application 16 clients utilizing key tokens 20 received from the authorization server 14 by providing startup information for accessing the distribution server 30. Thus, prior to receiving a multicast session information, the media player application 16 contacts the authorization server 14 and submits a request for a key token 20. The media player application 16 provides user and password credentials along with the request through a backchannel 18 to the authorization server 14. The authorization server 14, upon receipt of user and password credentials, validates the user and password credentials. Successful validation results in a key token 20 being returned to the media player application 16. The media player application 16 and authorization server 14 remain in communication via the backchannel 18. Once the key token 20 is received by the media player application 16, the media player application 16 contacts the streaming server 12 and provides the streaming server 12 with the key token 20. The streaming server 12 contacts the authorization server 14 in order to validate the key token 20 via the validation channel. The authorization server 14 authenticates the key token 20 and provides validation signal to the streaming server 12. Once the authorization server 14 validates the request with the streaming server 12, startup information for accessing the multicast session information is returned to the media player application 16 to enable the media player client to access the requested multimedia content stream on the distribution server 30. Once the media player application 16 receives the startup information, the connection with the streaming server 12 is terminated. The media player application then contacts the distribution server to receive the multicasted multimedia data stream. The multicasted multimedia data stream is transmitted by the distribution server as an encrypted signal. The media player receives the encrypted multicasted multimedia data stream from the distribution server 30 as well as a cryptographic key from the authorization server 14. The media player application is able to decrypt the encrypted multicasted multimedia data stream using a cryptographic decryption process.

Figure 3:
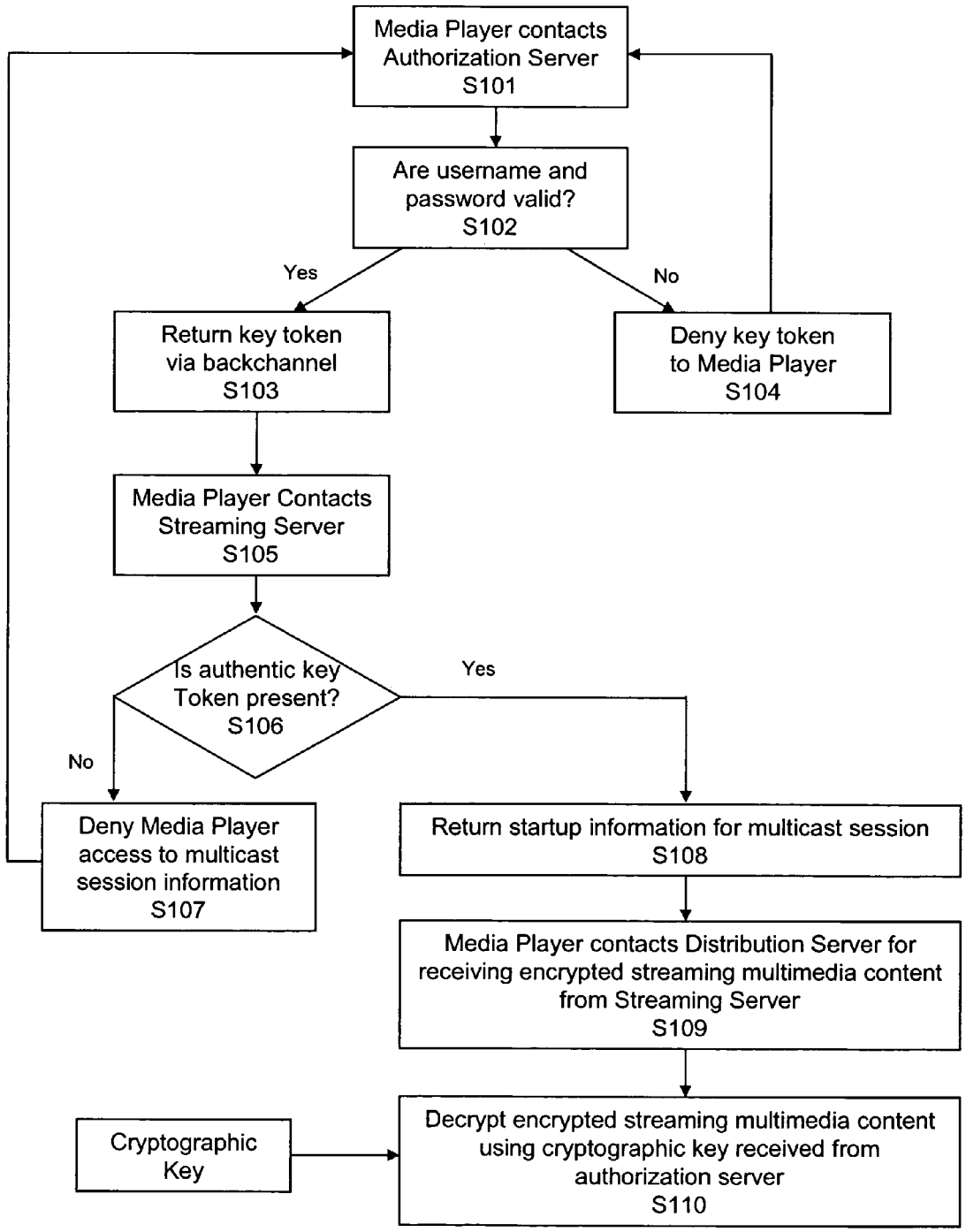
FIG. 3 is a flow diagram of the system for authorizing multimedia multicasting according to invention principles.

FIG. 3 is a flow chart of the present invention in use. In step S101, a media player application 16 contacts the authorization server 14. The request is made through a backchannel 18 and includes username and password credentials for the media player application 16. In step S102, the authorization server 14 validates the username and password. The usernames and passwords are unique to users who have been granted authorization to access the streaming server 12. Upon determining that the username and password are valid, the authorization server 14 generates a key token 20 identifying the media player application 16 and the active session the media player application is attempting to access and provides the key token 20 to the media player application 16 thru the backchannel 18 in step S103. If, however, the username and password are invalid, the authorization server 14 denies the key token 20 to the media player application 16, thereby not authorizing the media player application 16 to receive content from the streaming server 12 as show in step S104. When the active session is terminated or ends and the media player application 16 wishes to receive another multicasted data stream, the media player application must request a new key token which 20 identifies the media player application 16 and the new active session the media player application is attempting to access.

After receiving the key token 20, the media player application 16 provides the key token 20 to the streaming server 12 in step S105. The streaming server 12 then contacts the authorization server 14 to validate the key code 20 via the validation channel as described in step S106. Upon validation from the authorization server 14, start up information for accessing the multicast content stream information is returned to the media player application 16 as described in step S108. Once the start up information is received, the connection with the streaming server is terminated and the media player application contacts the distribution server 30 in order to access the content stream as described in step S109. If, however, the key token 20 received from the media player application 16 is determined to be invalid by the authorization server 14, the streaming server 12 denies the media player application 16 access to the multicast content stream information as stated in step S107. In order for the media player application 16 to receive access to the multicast content stream information from the streaming server 12, the media player application 16 obtains a valid key token 20 from the authorization server 14 before contacting the streaming server 12. Only with the proper key token 20 will the media player application 16 client be granted access to the contents residing on the streaming server 12. The content stream is transmitted as an encrypted multicast signal. Thus, in order to receive and view the content information, a media player application must not only be authorized and receive startup information from the streaming server 12, but must also receive a cryptographic key from the authorization server 14 via the backchannel connection. Upon receipt of the encrypted content stream information and the cryptographic key, the media player client decrypts the content stream information using a cryptographic decryption process. The cryptographic decryption process may be stored at the media player application, provided by the streaming server with the startup information or provided by the authorization server with the cryptographic key.

Figure 4:
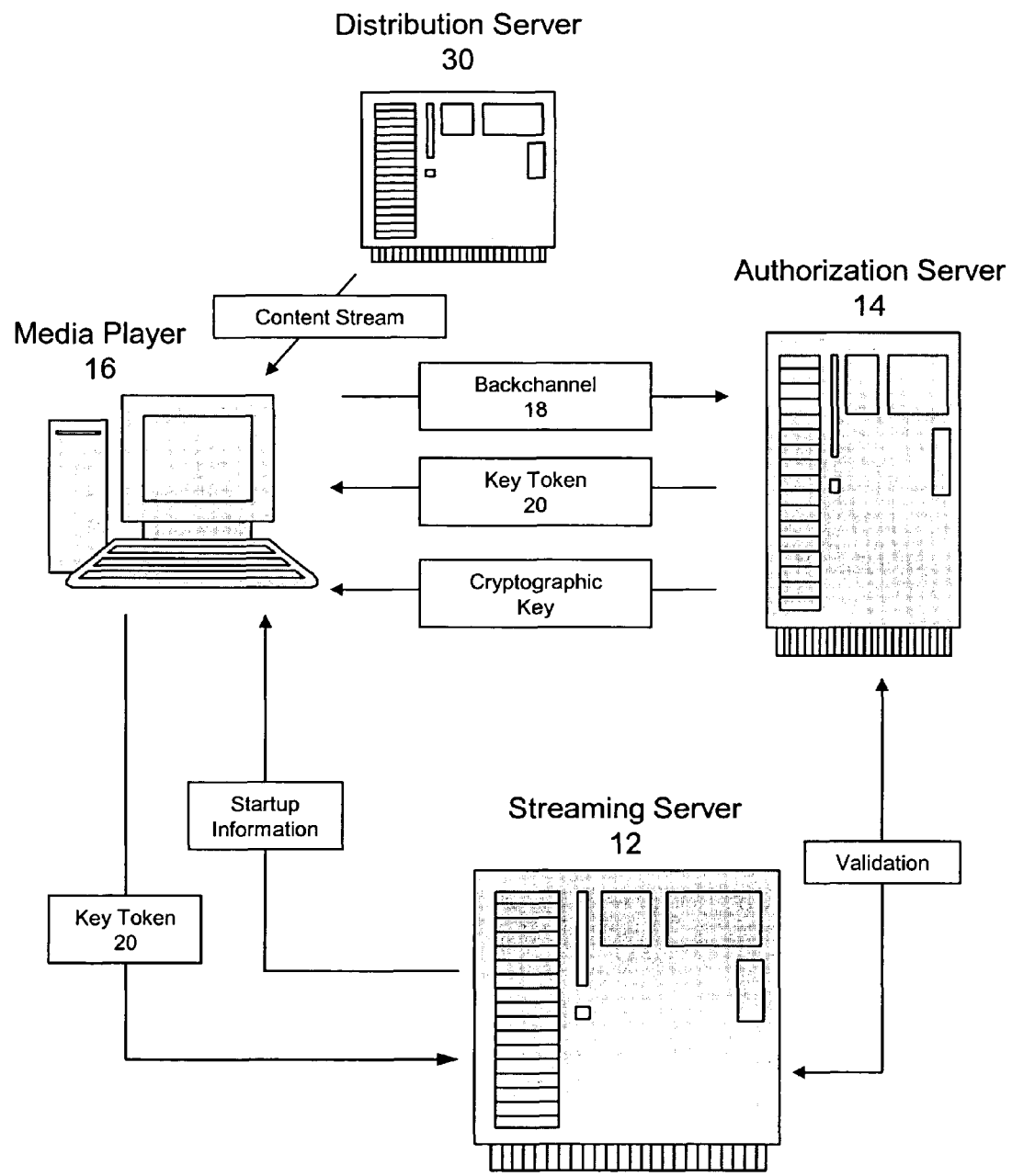
FIG. 4 is an illustrative view of the client media player requesting a key token from the authorization server, and accessing the streaming server; according to invention principles.

FIG. 4 is an illustrative view of the client media player application 16 requesting a key token 20 from the authorization server 14, and accessing the streaming server 12 and distribution processor 30. The media player application 16 logs onto the authorization server 14 by sending a request including a username and password to the authorization server 14. Upon validation of the username and password, the authorization server 14 generates a key token 20 which is provided to the media player application 16 and allows the media player to access the streaming server 12. The key token 20 is sent from the authorization server 14 to the media player application 16 via the backchannel 18 and a connection between the media player application 16 and authorization server 14 is maintained via the backchannel 18 for the duration of any communication with the streaming server 12.

After the media player application 16 receives the key token 20 through the backchannel 18 from the authorization server 14, the media player application 16 contacts the streaming server 12 with the authorization key token 20. The key token 20 is then used by the streaming server 12 to validate the authenticity of the media player application 16 with the authorization server 14. Upon successful validation, start up information for accessing the distribution server broadcasting the multicast content stream information is returned to the media player application 16. Once the start up information is received by the media player application 16, the connection between the media player application 16 and streaming server is terminated and the media player application is able to contact the distribution server 30 for accessing the streaming multimedia content. The streaming multimedia content is encrypted by the distribution server. The media player application 16 also receives a cryptographic key from the authorization server via the backchannel. The cryptographic key may be used by the media player application 16 for decrypting the encrypted streaming multicasted multimedia content using a cryptographic decryption process.

If, however, the key token 20 received from the media player application 16 is invalid, the streaming server 12 will not provide the start up information to the media player application 16 effectively denying access to the multicast content stream information. In order for the media player application 16 to receive access to the multicast content stream information, the media player application 16 must obtain a valid key token 20 from the authorization server 14 before contacting the streaming server 12. Only with the proper key token 20 will the media player application 16 client be granted access to the startup information provided by the streaming server 12 for use in accessing the multicasted multimedia data stream.

The system, user interface image and processes presented in FIGS. 1-4 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, any of the functions provided by the system of FIGS. 1, 2 and 4 and process of FIG. 3 may be implemented in hardware, software or a combination of both. The resource monitoring system and display image presents an overall view of activities of an enterprise, showing a schedule of resources indicating their status, duration of use, priority of use, and time (and date) of availability that adaptively compensates for an unscheduled delay in an activity.

What is claimed is:

1. A method for authorizing receipt of a multicast data stream by a user system comprising the activities of:

requesting an authorization code from an authorization server to receive the multicast data stream by a user system;

receiving at the user system an authorization code from the authorization server;

providing the authorization code to a streaming server;

validating the authorization code with the authorization server by the streaming server by contacting the authorization server by the streaming server, providing the authorization code from the streaming server to the authorization server, determining, by the authorization server if the authorization code is valid, and receiving a validation signal at the streaming server upon determining the authorization code is valid;

receiving startup information from the streaming server for accessing the multicast data stream information upon validation of the authorization code by the authorization server;

disconnecting the user system from the streaming server upon receipt of the startup information by the user system; and requesting, by the user system, the multicast data stream from a distribution server different from said streaming server in accordance with the startup information provided by said streaming server.

2. The method of claim 1, wherein the multicast data stream is an encrypted data stream.

3. The method of claim 2, further comprising the activities of:

maintaining a connection between the user system and the authorization server during receipt of the multicast data stream;

receiving, at the user system, a cryptographic code from the authorization server; and decrypting the encrypted multicast datastream using the cryptographic code received from the authorization server according to a decryption process.

4. The method of claim 1, further comprising the activity of:

establishing a backchannel connection between the user system and the authorization server; and maintaining the backchannel connection between the user system and the authorization server throughout the multicast reception.

5. The method of claim 1, wherein the activity of requesting includes providing username and password credentials to the authorization server by the user system.

6. The method of claim 1, wherein the authorization code includes a key token.

7. The method of claim 1, further comprising the activity of maintaining a connection between the user system and the authorization server during receipt of the multicast data stream.

8. The method of claim 6, wherein the key token from the authorization server is received by the user system through a backchannel.

9. The method of claim 1, wherein said user system is a media player.

10. A multicasting authorization system for providing access to a multicast datastream comprising:

a client application;

an authorization server, said authorization server coupled to receive an authorization code request from and providing an authorization code to said client application;

a streaming server that receives the authorization code from said client application, contacts the authorization server and provides the authorization code to said authorization server for validation, said streaming server providing startup information for accessing the multicast datastream to said client application upon receipt of a validation signal from said authorization server indicating the authorization code is valid, said client application being disconnected from said streaming server after receipt of the startup information by the client application; and a distribution server, different from said streaming server, coupled to said client application, that provides the multicast data stream identified by the startup information to the client application.

11. The system of claim 10, wherein the multicast datastream accessed by the client application is encrypted and said authorization server provides said user system a cryptographic key for decrypting the encrypted datastream.

12. The system of claim 11, wherein said system maintains a connection between said client application and said authorization server throughout receipt of the encrypted multicast data stream.

13. The system of claim 10, wherein the client application comprises a media player.

14. The system of claim 10, further comprising a data channel for connecting the client application to the authorization server.

15. The system of claim 10, wherein the streaming server and authorization server are connected via a validation channel for validating the client application to the streaming server.

16. The system of claim 10, further comprising a plurality of client applications, each client application connecting to said authorization server for receiving an authorization code to access the multicast datastream.

17. The system of claim 16, wherein each client application connects with said streaming server to receive startup information for accessing a desired multicast datastream.

18. The system of claim 10, wherein the multicast data stream includes at least one of video data and audio data.

19. The system of claim 10, wherein the authorization code is a key token.

* * * * *